(12) United States Patent
Rannikko et al.

(10) Patent No.: US 8,520,395 B2
(45) Date of Patent: Aug. 27, 2013

(54) SLIDING MODULE WITH ELECTRICAL CONNECTION PATHS

(75) Inventors: Saara Pauliina Rannikko, Kisko (FI); Jari Juhani Lamminparras, Turku (FI); Tommi Antero Teuri, Teijo (FI)

(73) Assignee: Nokia Corporation, Espoo (FI)

( * ) Notice: Subject to any disclaimer, the term of this patent is extended or adjusted under 35 U.S.C. 154(b) by 584 days.

(21) Appl. No.: 12/532,823

(22) PCT Filed: Mar. 23, 2007

(86) PCT No.: PCT/EP2007/002714
§ 371 (c)(1),
(2), (4) Date: Jun. 15, 2010

(87) PCT Pub. No.: WO2008/116486
PCT Pub. Date: Oct. 2, 2008

(65) Prior Publication Data
US 2010/0290198 A1    Nov. 18, 2010

(51) Int. Cl.
*H05K 1/14* (2006.01)
*H01R 13/64* (2006.01)

(52) U.S. Cl.
USPC ............................................ 361/741; 439/377

(58) Field of Classification Search
None
See application file for complete search history.

(56) References Cited

U.S. PATENT DOCUMENTS

| | | | |
|---|---|---|---|
| 5,499,161 A * | 3/1996 | Hosseinzadeh et al. | 361/749 |
| 5,548,484 A * | 8/1996 | Kantner | 361/737 |
| 5,982,611 A * | 11/1999 | Campbell et al. | 361/664 |
| 6,645,007 B1 | 11/2003 | Ko | |
| 7,109,831 B2 * | 9/2006 | McMiller et al. | 334/88 |
| 2002/0137476 A1 * | 9/2002 | Shin | 455/90 |
| 2006/0097929 A1 | 5/2006 | Chung | |
| 2006/0189199 A1 * | 8/2006 | Lang et al. | 439/374 |
| 2006/0238423 A1 * | 10/2006 | Ozden | 343/702 |
| 2006/0273174 A1 * | 12/2006 | Laitinen et al. | 235/441 |
| 2008/0150816 A1 * | 6/2008 | Rahola et al. | 343/720 |
| 2008/0151503 A1 * | 6/2008 | Aapro et al. | 361/714 |
| 2008/0266264 A1 * | 10/2008 | Lipponen et al. | 345/169 |
| 2009/0088143 A1 * | 4/2009 | Kim et al. | 455/418 |
| 2009/0117944 A1 * | 5/2009 | Lee et al. | 455/566 |
| 2009/0135555 A1 * | 5/2009 | Komine et al. | 361/679.26 |
| 2009/0137293 A1 * | 5/2009 | Yoo et al. | 455/575.4 |
| 2009/0147485 A1 * | 6/2009 | Higashigawa et al. | 361/727 |

OTHER PUBLICATIONS

International Search Report and Written Opinion of the International Searching Authority for PCT Application No. PCT/ EP2008/002714, dated Feb. 27, 2008. 12 pages.

* cited by examiner

*Primary Examiner* — Lisa Lea Edmonds
*Assistant Examiner* — Xanthia C Cunningham
(74) *Attorney, Agent, or Firm* — Harrington & Smith

(57) ABSTRACT

A sliding module for an electronic device, the module comprising first and second parts slideably connected together, the first and second parts comprising respective circuit connectors for connection with corresponding respective circuit boards, and wherein the module comprises one or more conductors arranged to provide electrical connection between the respective circuit connectors to thereby provide electrical connection paths between respective circuit boards connected at the circuit connectors.

19 Claims, 13 Drawing Sheets

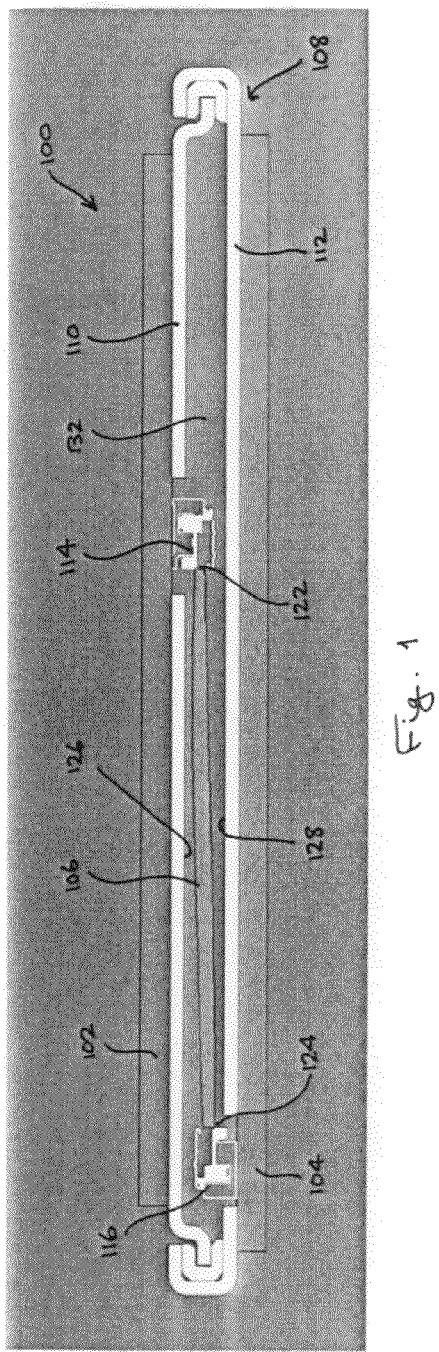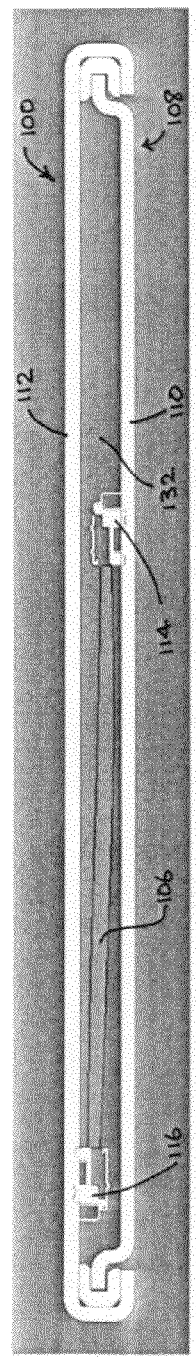

SLIDING MODULE WITH ELECTRICAL CONNECTION PATHS

RELATED APPLICATION

This application was originally filed as PCT Application No. PCT/EP2007/002714 on Mar. 23, 2007, which is incorporated herein by reference in its entirety.

The invention relates to sliding modules for electronic devices and associated apparatus. The sliding modules are used to provide (e.g. a biased) first (e.g. open) and second (e.g. closed) configurations of the electronic device.

The electronic devices may or may not be a hand portable, which is hand-held in use. The portable electronic device may or may not include the functions of any one or more of a radiotelephone, a personal digital assistant, a digital camera, a multimedia device, and a games console.

BACKGROUND

FIG. 12 shows a known portable electronic device 50 which includes first and second parts 52, 54. The first part 52 includes a first printed wiring board (not shown) and the second part 54 includes a second printed wiring board 60. The printed wiring boards are electrically connected to one another by a flexible printed circuit (FPC) 56, which is folded over itself in a cavity 62 between the parts 52, 54. The first and second parts 52, 54 can be slid relative to one other by way of a slide module 58. The flexible printed circuit 56 is positioned adjacent the slide module 58.

The listing or discussion of a prior-published document in this specification should not necessarily be taken as an acknowledgement that the document is part of the state of the art or is common general knowledge.

SUMMARY

According to a first aspect, there is provided a sliding module for an electronic device, the module comprising first and second parts slideably connected together, the first and second parts comprising respective circuit connectors for connection with corresponding respective circuit boards, and wherein one or more conductors are arranged to provide electrical connection between the respective circuit connectors to thereby provide electrical connection paths between respective circuit boards connected at the circuit connectors.

The first and second parts may be slideably connected together to define a cavity therebetween, and the cavity may comprise one or more conductors arranged to provide electrical connection between the respective circuit connectors to thereby provide electrical connection paths between respective circuit boards connected at the circuit connectors.

One, more or all of the connectors may or may not move out of the cavity during sliding movement.

The module may be arranged such that one, more, or all of the conductors are arranged to flex in substantially a flat plane with sliding movement of the parts.

The module may be arranged such that one, more, or all of the connectors are arranged to flex in a direction offset/perpendicular to the sliding axis with sliding movement of the parts.

One, more or all of the conductors may be flexible conductors.

One, more or all of the conductors may be micro-coaxial cables.

One or more connectors may provide multiple connection points for respective multiple conductors. The connection points may be arranged to extend parallel to the sliding axis of the parts.

One or more of the connectors may be arranged to extend along the sliding axis of the module.

The one or more conductors may be arranged to extend substantially perpendicular to the sliding axis of the parts.

The connection ends of the one or more conductors may be arranged to extend substantially perpendicular to the sliding axis of the parts.

The one or more conductors may have a first configuration associated with a retracted sliding position of the parts, and a second configuration associated with an extended sliding position of the parts.

The one or more conductors may have a Z configuration associated with a retracted sliding position of the parts, and an S configuration associated with an extended sliding position of the parts.

The one or more conductors may have an S configuration associated with a retracted sliding position of the parts, and a Z configuration associated with an extended sliding position of the parts.

One or the other of the first and second parts may comprise a further connector and one or more further conductors arranged to provide electrical connection between the further connector and one or both of the connectors of the first and second parts.

The circuit connectors may be micro-coaxial cable connectors or board-to-board connectors. The circuit connectors may be printed wiring board connectors. The circuit connectors may be flexible printed circuit (FPC) connectors.

The sliding module may comprise respective printed wiring boards connected to the respective circuit connectors.

The sliding module may comprise respective printed wiring boards connected to the respective connectors and to the respective parts. The sliding module may comprise respective flexible printed circuit (FPC) connected to the respective circuit connectors and to the respective parts.

The conductors may extend in a substantially flat plane between the connectors. This plane may be inclined or have no inclination with respect to a plane parallel to the direction of sliding.

The conductors may extend in a direction being transverse to the direction of the relative sliding movement of the first and second parts.

Opposing surfaces of the cavity may be arranged to constrain the conductors to extend in a substantially flat plane between the connectors.

The sliding module may comprise a loop for bundling the conductors together.

The loop may be arranged to constrain the conductors to extend in a substantially flat plane between the connectors.

The first and second parts may be connected to housings for an electronic device.

The first and second parts may carry respective first and second housings for the electronic device to slideably move the first and second housings between first (e.g. open) and second (e.g. closed) configurations.

According to a second aspect, there is provided an electronic device comprising the module of the first aspect.

According to a third aspect, there is provided a method of using a sliding module for an electronic device, the module comprising first and second parts slideably connected together, the first and second parts comprising respective connectors for connection with corresponding respective circuit boards, and wherein the module comprises one or more conductors arranged to provide electrical connection between the respective circuit connectors to thereby provide electrical connection paths between respective circuit boards connected at the circuit connectors, the method comprising sliding the first and second parts between two or more different configurations.

According to a fourth aspect, there is provided a sliding module for an electronic device, the module comprising first and second parts slideably connected together, the first and second parts comprising respective means for circuit connection with corresponding respective circuit boards, and wherein the cavity comprises one or more means for conduction arranged to provide electrical connection between the respective means for circuit connection to thereby provide electrical connection paths between respective circuit boards connected at the means for circuit connection.

According to a fifth aspect, there is provided a method of using a sliding module for an electronic device, the module comprising first and second parts slideably connected together, the first and second parts comprising respective means for circuit connection with corresponding respective circuit boards, and wherein the module comprises one or more means for conduction arranged to provide electrical connection between the respective means for circuit connection to thereby provide electrical connection paths between respective circuit boards connected at the means for circuit connection, the method comprising sliding the first and second parts between two or more different configurations.

According to a sixth aspect, there is provided a sliding module for an electronic device, the module comprising first and second parts slideably connected together, the first and second parts comprising apertures for respective circuit connectors for connection with corresponding respective circuit boards, and wherein the module comprises one or more conductors arranged to provide electrical connection between the respective connectors to thereby provide electrical connection paths between respective circuit boards connected at the circuit connectors.

The module may comprise first and second parts slideably connected together to define a cavity therebetween, and the apertures may be apertures into the cavity defined between the first and second parts.

According to a seventh aspect, there is provided a slide module for an electronic device, the module comprising first and second parts slideably connected together to provide first and second slide configurations for an electronic device, the first and second parts comprising respective circuit connectors for connection with corresponding respective circuit boards, and wherein the module comprises one or more conductors arranged to provide electrical connection between the respective circuit connectors to thereby provide electrical connection paths between respective circuit boards connected at the connectors, and wherein the one or more conductors are constrained from bending over themselves out of a substantially flat configuration.

According to a eighth aspect, there is provided a portable electronic device comprising
a first circuit board and a second circuit board, the first and second circuit boards being slideably movable relative to one another between at least two configurations;
the first circuit board having a first electrical circuit connector and the second circuit board having a second electrical circuit connector; and
one or more flexible conductors extending between the first and second electrical circuit connectors, wherein the device is arranged to prevent each flexible conductor from folding over itself in any configuration of the device.

According to a ninth aspect, there is provided a portable electronic device comprising
a first circuit board and a second circuit board, the first and second circuit boards being slideably movable relative to one another between at least two configurations;
the first circuit board having a first electrical circuit connector and the second circuit board having a second electrical circuit connector; and
one or more flexible conductors extending between the first and second electrical circuit connectors, wherein the device is arranged to prevent each flexible conductor from doubling up in any configuration of the device.

According to an tenth aspect, there is provided a portable electronic device comprising
a first circuit board and a second circuit board, the first and second circuit boards being slideably movable relative to one another between at least two configurations;
the first circuit board having a first electrical circuit connector and the second circuit board having a second electrical circuit connector; and
a plurality of flexible conductors extending between the first and second electrical circuit connectors so as to be substantially flat in any configuration of the device.

According to any of the sixth to tenth aspects, at least part of one or more of the conductors may be positioned within a cavity defined by opposing surfaces of first and second sliding parts of a slide module that provides the relative sliding movement of the first and second printed wiring boards.

The present invention includes one or more aspects, embodiments or features in isolation or in various combinations whether or not specifically stated (including claimed) in that combination or in isolation.

The above summary is intended to be merely exemplary and non-limiting.

BRIEF DESCRIPTION OF THE DRAWINGS

A description is now given, by way of example only, with reference to the accompanying drawings, in which:—

FIG. 1 is a cross section of an apparatus comprising a sliding module for a portable electronic device, the cross section being along an axis perpendicular to the sliding axis;

FIG. 2 is a cross section of the apparatus of FIG. 1 with printed wiring boards removed;

FIG. 15 is a schematic diagram of a second apparatus in a first configuration;

FIG. 16 is a schematic diagram of the apparatus of FIG. 15 in a second configuration;

FIG. 17 is a schematic diagram of a third sliding module in a first configuration;

FIG. 18 is a schematic diagram of the sliding module of FIG. 17 in a second configuration;

FIG. 19 is a schematic diagram of a fourth sliding module in a first configuration;

FIG. 20 is a schematic diagram of the sliding module of FIG. 19 in a second configuration.

DETAILED DESCRIPTION

Figure 3:
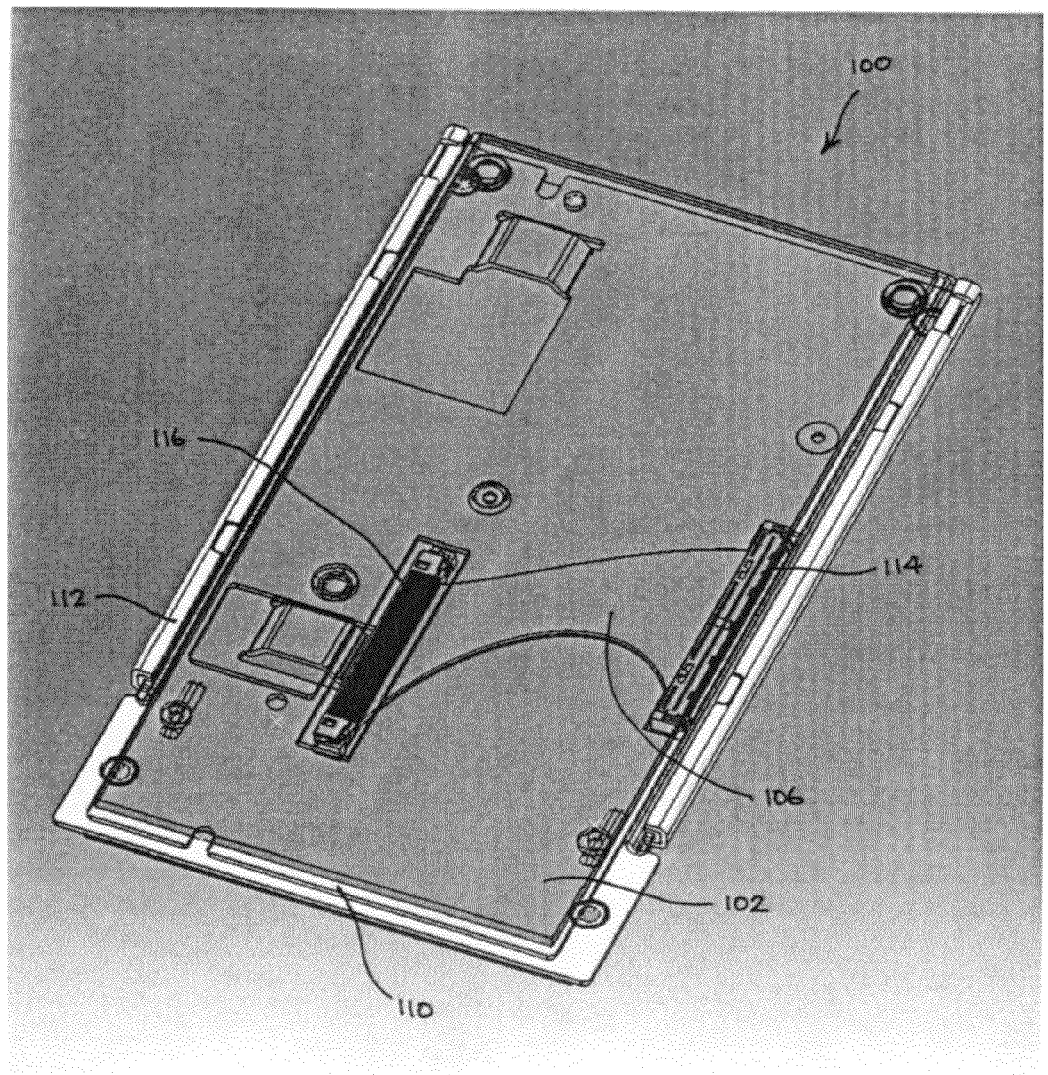
FIG. 3 is a perspective view of the apparatus of FIG. 1 in a first configuration showing internal details of the apparatus.
Figure 4:
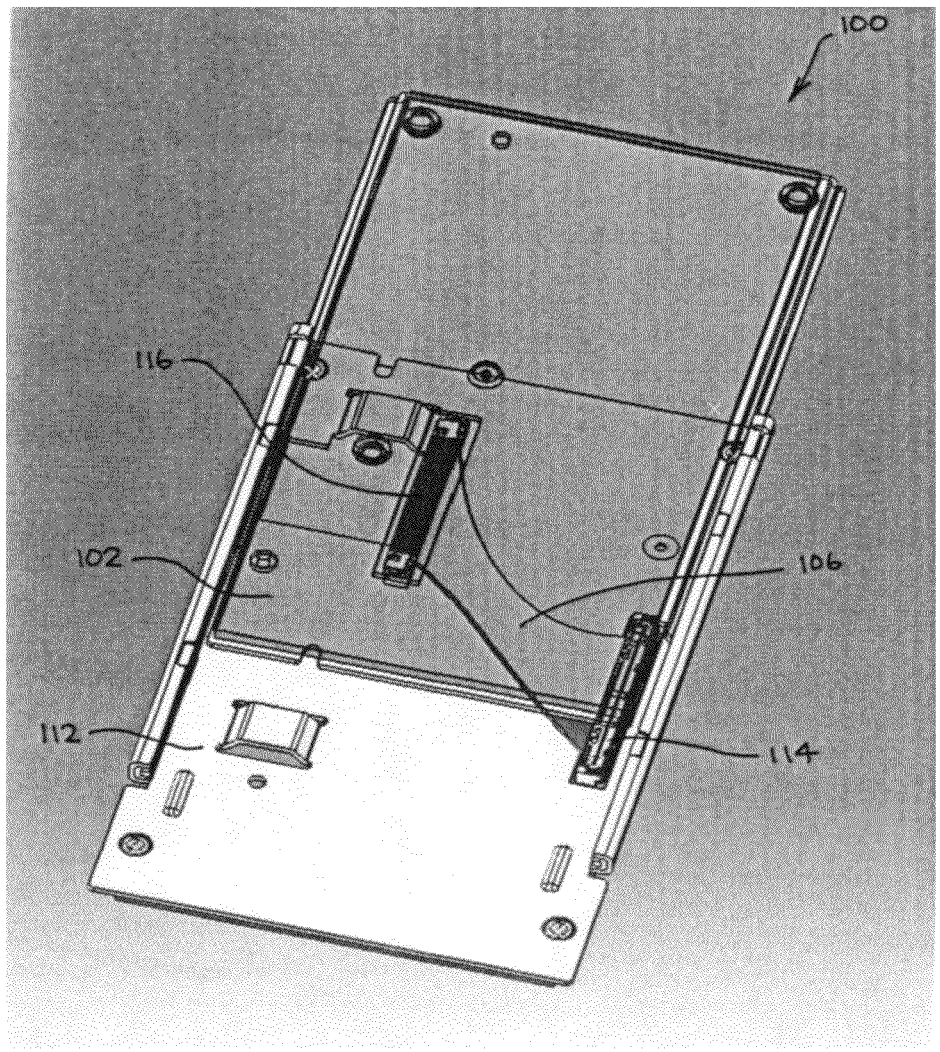
FIG. 4 is a perspective view of the apparatus of FIG. 1 in a second configuration showing internal details of the module.
Figure 5:
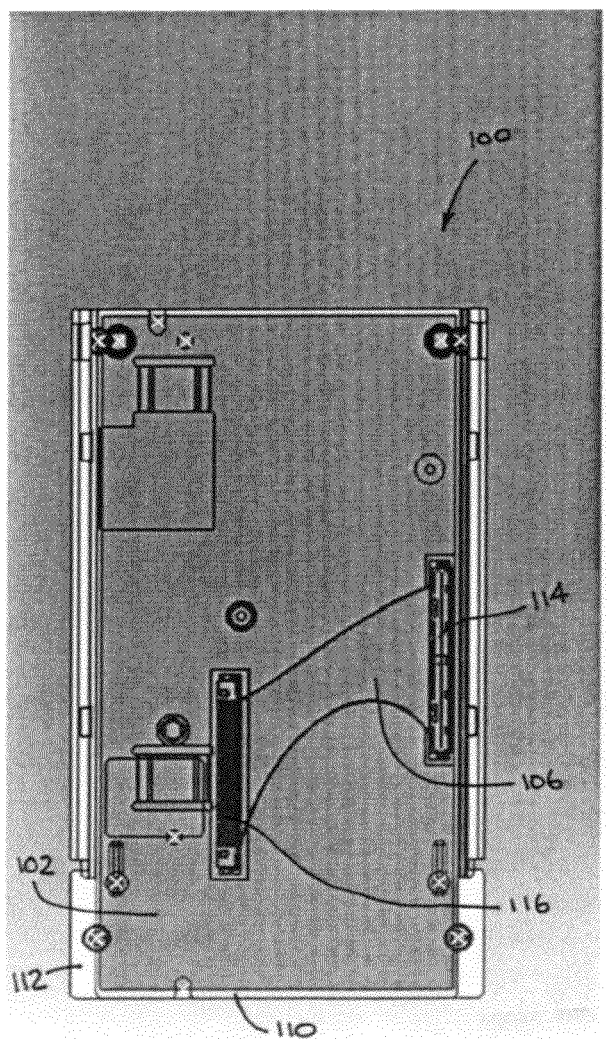
FIG. 5 is a plan view of the apparatus of FIG. 1 in the first configuration showing internal details of the apparatus.
Figure 6:
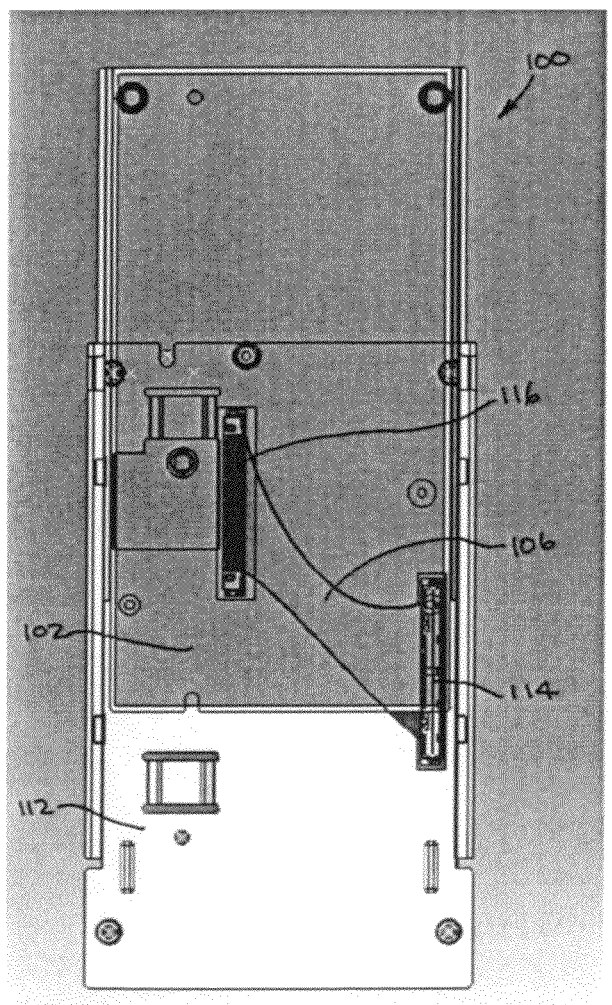
FIG. 6 is a plan view of the apparatus of FIG. 1 in the second configuration showing internal details of the apparatus.
Figure 7:
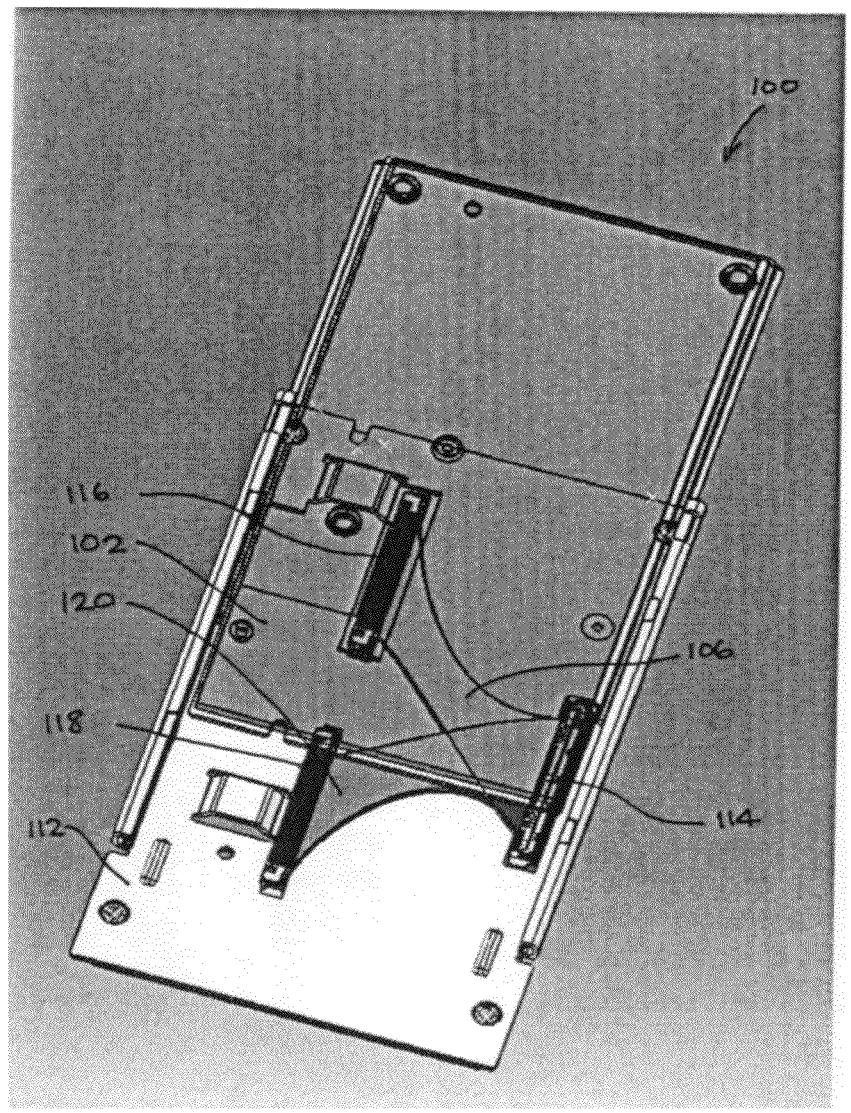
FIG. 7 is a perspective view of a variant to the apparatus of FIG. 1 showing internal details of the apparatus.
Figure 8:
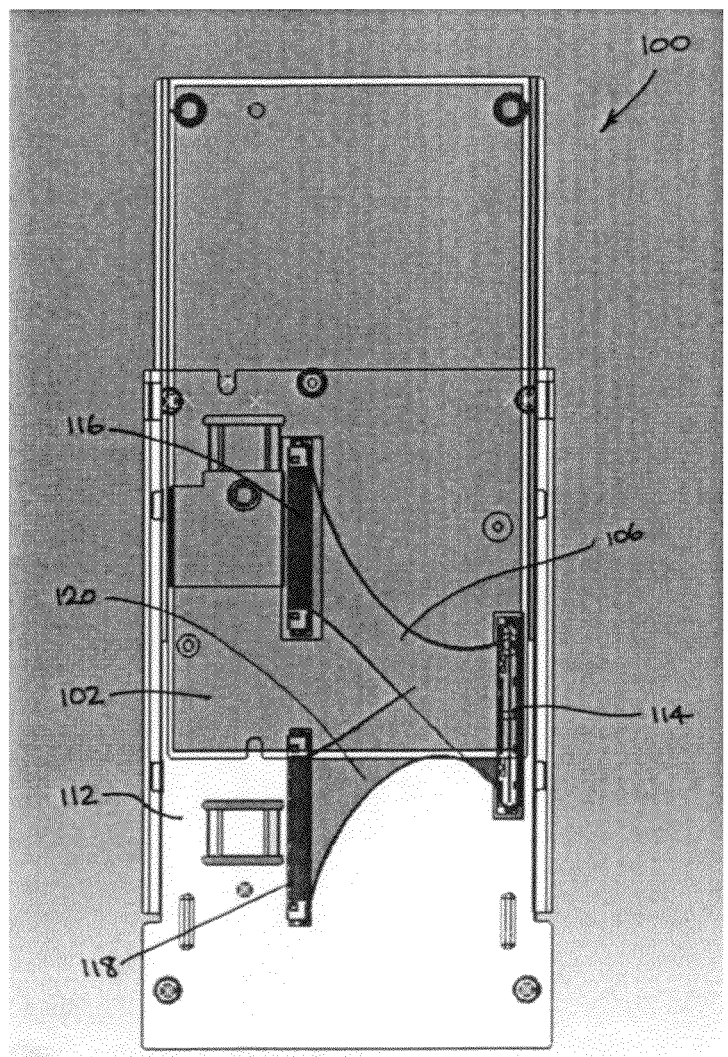
FIG. 8 is a plan view of the variant of FIG. 7.
Figure 9:
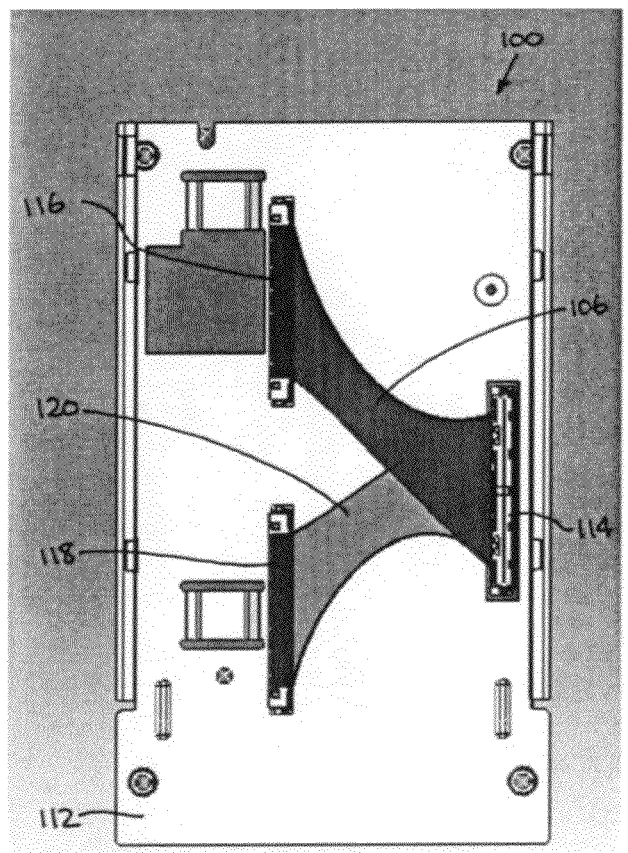
FIG. 9 is a plan view of part of the variant of FIG. 7 with a first sliding part and first printed wiring board removed.
Figure 10:
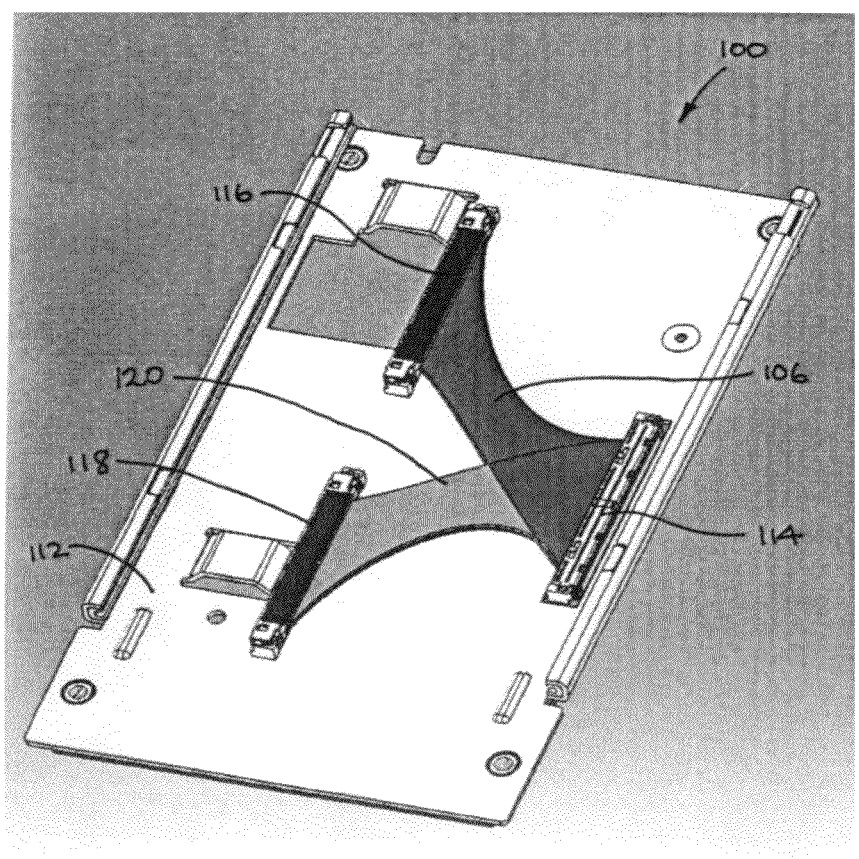
FIG. 10 is a perspective view of the part shown in FIG. 11.
Figure 11:
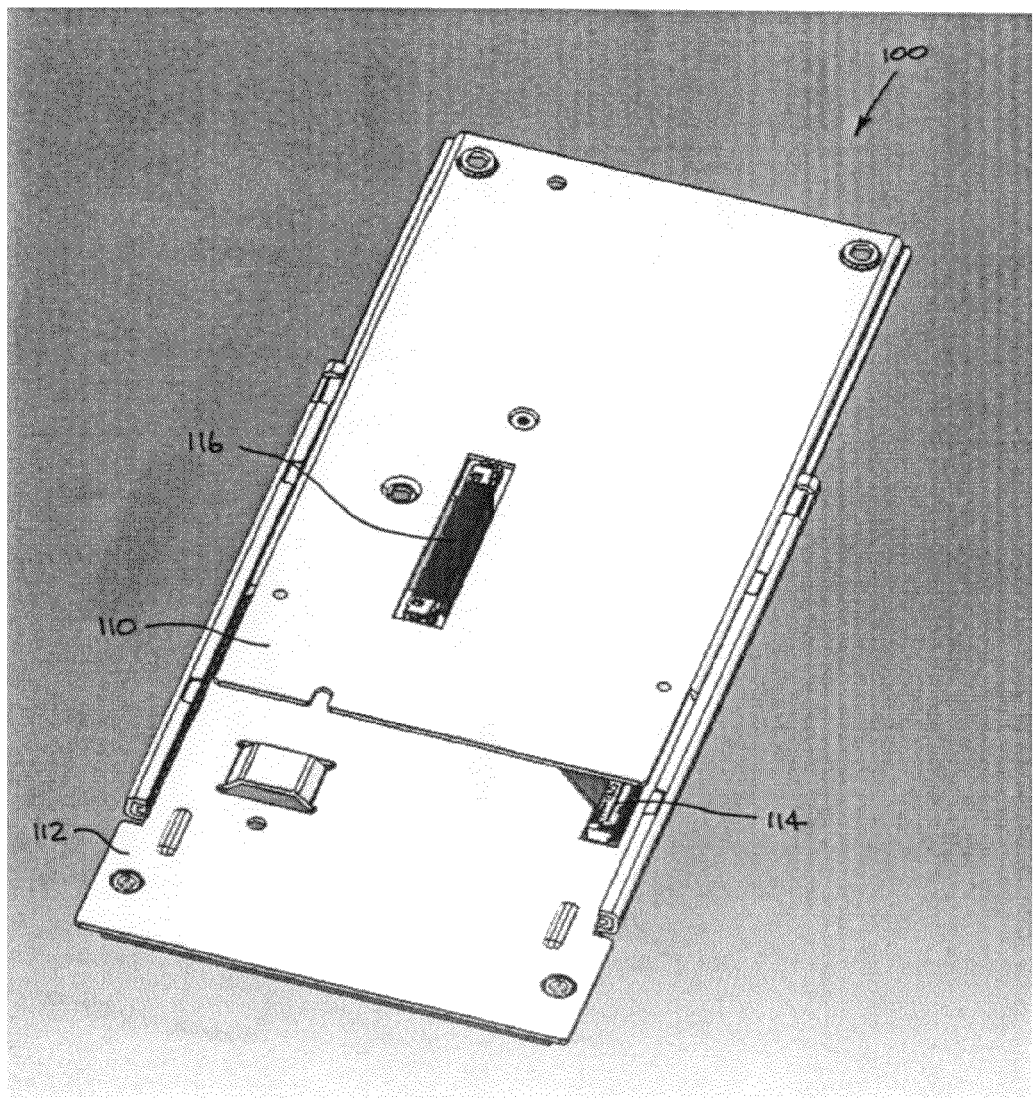
FIG. 11 is a perspective view of apparatus of FIG. 1 with a first printed wiring board removed.

FIGS. 1 to 6 show a sliding module 108 for a portable electronic device. The apparatus 100 shown in these figures includes a first printed wiring board 102 and a second printed wiring board 104, the first and second printed wiring boards 102, 104 being slideably movable relative to one another between at least two configurations including a first configuration (FIGS. 3 and 5) and a second configuration (FIGS. 4 and 6). In other embodiments, the printed wiring boards 102, 104 may be flexible printed circuits (FPC) boards.

The term printed wiring board encompasses printed circuit boards. The sliding module 100 may be biased between the first and second configurations. The biasing mechanism is not shown in the figures.

The first printed wiring board 102 has a first electrical connector 114 and the second printed wiring board 104 has a second electrical connector 116. The first and second electrical connectors 114, 116 extend in a direction being parallel with the direction of the relative sliding movement of the first and second printed wiring boards 102, 104.

As shown in FIG. 1, the first and second electrical connectors 114, 116 are arranged such that respective connection regions 122, 124 of the first and second electrical connectors 114, 116 oppose one another. The connections regions 122, 124 extend into a cavity 132 (discussed later) defined by the sliding module 108 through apertures in the parts 110, 112.

A plurality of micro coaxial cables 106 (electrical conductors) extend in a substantially planar manner (slightly inclined, but could be horizontal in other embodiments) between the connection regions 122, 124 of the first and second electrical connectors 114, 116. The planar manner is retained in both the first and second configurations of the apparatus 100. The cables 106 extend in a direction being transverse to the direction of the relative sliding movement of the first and second printed wiring boards 102, 104.

The slide module 108 includes a first sliding part 110 being slideable relative to a second sliding part 112 and provides the relative sliding movement of the first and second printed wiring boards 102, 104, which are attached respectively to the first and second sliding parts 110, 112. The first and second sliding parts 110, 112 define a cavity 132 therebetween. At least part of one or more of the cables 106 is positioned within the cavity 132.

The first and second parts 110, 112 of the sliding module 108 are arranged to carry respective first and second housings (not shown) of the portable electronic device and provide the sliding movement of the device between first and second device configurations.

As shown in FIG. 1, the first sliding part 110 includes a first inner surface 126 and the second sliding part 112 includes a second inner surface 128, the first and second inner surfaces 126, 128 form opposing surfaces of the cavity 132. The inner surfaces 126, 128 are arranged to constrain the cables 106 to prevent the cables 106 from folding over themselves or doubling up, in order that the cables 106 can extend in the substantially planar manner between the first and second electrical connectors 114, 116.

Figure 12:
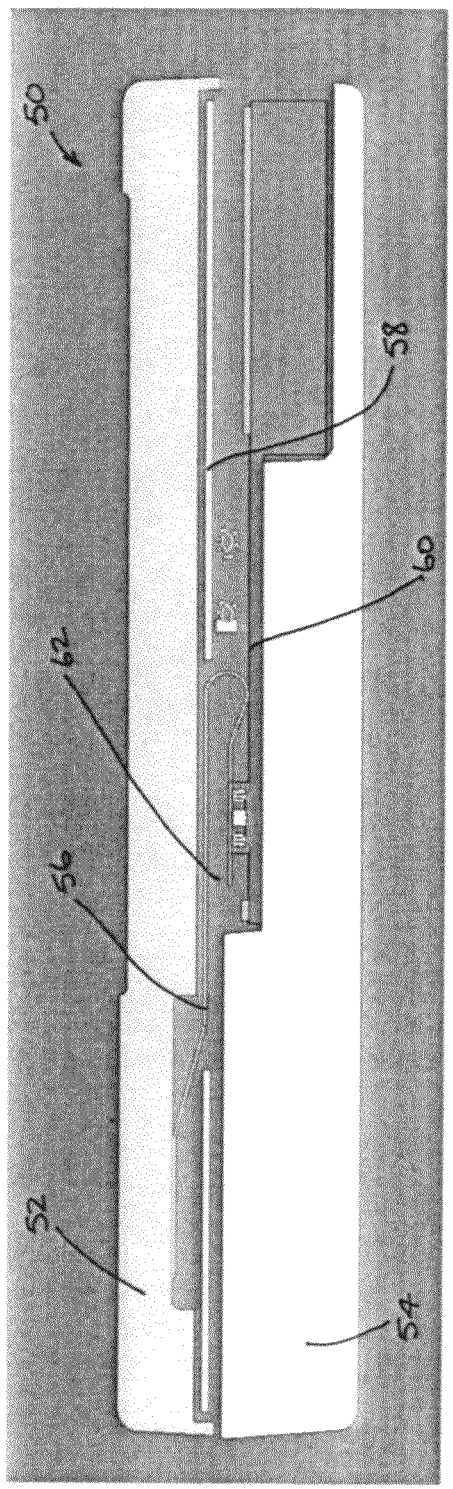
FIG. 12 is a cross section of a portable electronic device according to the prior art.

"Folding over themselves" or "doubling up" means that the bending occurs in a plane being substantially perpendicular to a plane of one or both of the inner surfaces 126, 128, as with the flexible printed circuit 56 in the device 50 of FIG. 12. The phrase "substantially planar manner" relates to the absence of such bending, and may indicate that a central region running along the length of each cable is not substantially separated at any point along its length from a plane in which both the first and second connection regions 122, 124 lie. Thus, as shown in FIGS. 1 to 6, the plurality of cables 106 remains substantially flat in any configuration of the apparatus 100.

As shown in FIGS. 1 to 6, the micro coaxial cables 106 are not bent to the same degree as the flexible printed circuit 56 in the device 50 of FIG. 12. Although they may bend in a plane substantially parallel to the sliding axis, they do not bend back over themselves out of a substantially flat configuration.

The apparatus 100 includes a bistable biasing mechanism (not shown, but which could use spring mechanisms/guide rails etc) whereby the first and second printed wiring boards 102, 104 are biased towards the first and second configurations.

In use, a user slides the first and second printed wiring boards 102, 104 between the first and second configurations in order to reveal or hide various parts of an electronic device, for example user interfaces including displays and/or user input elements.

FIGS. 7 to 11 show a variant to the apparatus 100 of FIGS. 1 to 6. The variant includes a third electrical connector 118 and a second plurality of cables 120 extending in a substantially planar manner between the first and third electrical connectors 114, 118. The features of the apparatus 100 relating to the first plurality of cables 106 described above are also exhibited by the second plurality of cables 120.

Figure 13:
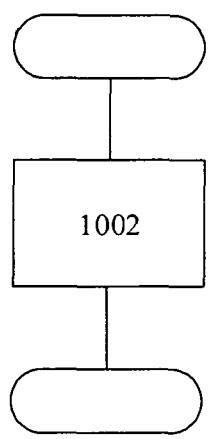
FIG. 13 is a flowchart representing a method of using a portable electronic device comprising a sliding module.
Figure 14:
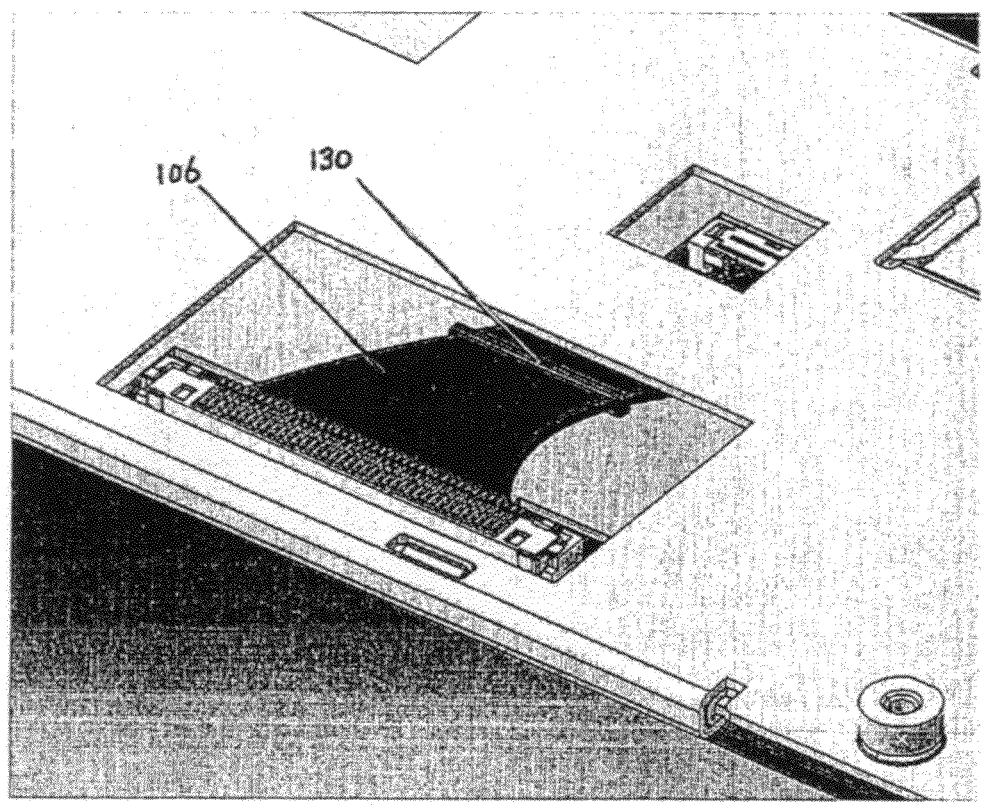
FIG. 14 shows a loop for bundling cables together.

FIG. 13 is a flowchart representing a method 1000 of using a sliding module for an electronic device. The method comprises sliding first and second parts between two or more different configurations (block 1002). In addition or instead of the inner surfaces 126, 128 of the slide module 108 constraining the cables 106, a loop 130 (as shown in FIG. 14) may be provided for bundling the cables 106 together. The loop 130 is arranged so as to maintain the planar (substantially flat) arrangement of the cables 106. The loop also acts to constrain the bundled cables 106 from moving laterally (in one or more planes perpendicular to their longitudinal axis).

FIG. 15 is a schematic diagram of a second apparatus 200 in a first configuration and FIG. 16 is a schematic diagram of the apparatus 200 in a second configuration. The apparatus 200 includes a first part 202 and a second part 204. The first part 202 includes a first connector 214 and the second part includes a second connector 216. Each connector 214, 216 extends in a direction being substantially perpendicular to the direction of the relative sliding movement of the first and second parts 202, 204, and the connectors 214, 216 face one another. A plurality of cables 206 extends in a planar manner between the first and second connectors 214, 216. The planar manner is retained in each of the first and second configurations. When in the second configuration, the cables 206 bend to accommodate the relative movement of the first and second connectors 214, 216 towards each other, but the bending is such that the cables 206 still lie within the same plane. In a variant, the cables 206 may lie within a cavity defined by first and second sliding parts (not shown) that provide the relative sliding movement of the first and second parts 202, 204.

FIG. 17 is a schematic diagram of a third sliding module 300 in a first configuration and FIG. 18 is a schematic diagram of the sliding module 300 in a second configuration. The sliding module 300 includes first and second sliding parts 310, 312 and first and second connectors 314, 316 positioned on respective sliding parts 310, 312. A plurality of conductors 306 extends between the first and second connectors 314, 316. In the first configuration, shown in FIG. 17, the conductors 306 have a Z configuration. In the second configuration, shown in FIG. 18, the conductors 306 have an S configuration.

The fourth sliding module 400 may provide first and second connectors 414, 416 which are perpendicular to one another such that one connector (414) has an axis which is parallel to the sliding axis, and the other connector (416) is arranged perpendicular to the sliding axis (FIGS. 19, 20).

One of the circuit boards may provide processing elements (e.g. processor, memory) for the user interface elements on the respective slideable part to which the circuit board is fixedly connected, and the other circuit board may provide processing elements to the user interface elements on the respective slideable part to which this other circuit board is connected.

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A module for an electronic device, the module comprising first and second parts slideably connected together, the first and second parts comprising respective circuit connectors for connection with corresponding respective circuit boards, said respective circuit connectors being connected to one another by one or more conductors, said one or more conductors extending in a substantially planar manner between said respective circuit connectors in a cavity between said first and second parts without folding over on themselves, and wherein said one or more conductors are configured to provide electrical connection between the respective circuit connectors to thereby provide electrical connection paths between respective circuit boards connected at the circuit connectors.

2. A module according to claim 1, wherein the first and second parts are slideably connected together to define said cavity therebetween.

3. A module according to claim 2 wherein opposing surfaces of the cavity are configured to constrain the conductors to extend in a substantially flat plane between the connectors.

4. A module according to claim 1 comprising a loop for bundling the conductors together.

5. A module according to claim 1, wherein the module is configured such that one, more, or all of the conductors are configured to flex in substantially a flat plane with sliding movement of the first and second parts.

6. A module according to claim 1, wherein one, more or all of the conductors are micro-coaxial cables.

7. A module according to claim 1, wherein one or more connectors provide multiple connection points for respective multiple conductors, and wherein the connection points are configured to extend parallel to the sliding axis of the first and second parts.

8. A module according to claim 1, wherein one or more of the connectors are configured to extend along the sliding axis of the module.

9. A module according to claim 1, wherein the one or more conductors are configured to extend substantially perpendicular to the sliding axis of the first and second parts.

10. A module according to claim 1, wherein the connection ends of the one or more conductors are configured to extend substantially perpendicular to the sliding axis of the parts.

11. A module according to claim 1, wherein the one or more conductors have a first configuration associated with a retracted sliding position of the first and second parts, and a second configuration associated with a extended sliding position of the first and second parts.

12. A module according to claim 1, wherein the one or more conductors have a Z or S configuration associated with a retracted sliding position of the first and second parts, and a respective S or Z configuration associated with an extended sliding position of the first and second parts.

13. A module according to claim 1 wherein one or the other of the first and second parts comprises a further connector and one or more further conductors configured to provide electrical connection between the further connector and one or both of the connectors of the first and second parts.

14. A module according to claim 1 comprising respective circuit boards connected to the respective connectors and to the respective first and second parts.

15. A module according to claim 1 wherein the conductors extend in a substantially flat plane between the connectors.

16. A module according to claim 1 wherein the conductors extend in a direction being transverse to the direction of the relative sliding movement of the first and second parts.

17. A module according to claim 4, wherein the loop is configured to constrain the conductors to extend in a substantially flat plane between the connectors.

18. An electronic device comprising the module according to claim 1.

19. A module for an electronic device, the module comprising first and second parts slideably connected together, the first and second parts comprising apertures for respective circuit connectors for connection with corresponding respective circuit boards, and wherein the module comprises one or more conductors configured to provide electrical connection between the respective circuit connectors to thereby provide electrical connection paths between respective circuit boards connected at the connectors, said one or more conductors extending in a substantially planar manner between said respective circuit connectors in a cavity between said first and second parts without folding over on themselves.

* * * * *